US008850169B1

(12) United States Patent
Kang et al.

(10) Patent No.: US 8,850,169 B1
(45) Date of Patent: *Sep. 30, 2014

(54) DISABLING THREADS IN MULTITHREAD ENVIRONMENT

(71) Applicant: Marvell International Ltd., Hamilton (BM)

(72) Inventors: Jack Kang, Sunnyvale, CA (US); Hsi-Cheng Chu, San Jose, CA (US); Yu-Chi Chuang, Jhubei (TW)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,889

(22) Filed: Jul. 1, 2013

Related U.S. Application Data (63) Continuation of application No. 13/330,305, filed on Dec. 19, 2011, now Pat. No. 8,478,971, which is a continuation of application No. 12/831,984, filed on Jul. 7, 2010, now Pat. No. 8,082,427, which is a continuation of application No. 11/775,444, filed on Jul. 10, 2007, now Pat. No. 7,757,070.

(60) Provisional application No. 60/911,070, filed on Apr. 10, 2007.

(51) Int. Cl.
*G06F 9/00* (2006.01)
*G06F 9/38* (2006.01)

(52) U.S. Cl.
CPC .................................. *G06F 9/3836* (2013.01)
USPC ......................................... 712/228; 712/229

(58) Field of Classification Search
USPC ............................................ 712/43, 228, 229
See application file for complete search history.

(56) References Cited

U.S. PATENT DOCUMENTS

| 5,900,025 | A  | 5/1999  | Sollars         |
|-----------|----|---------|-----------------|
| 7,134,124 | B2 | 11/2006 | Ohsawa et al.   |
| 7,159,220 | B2 | 1/2007  | Buch            |
| 7,243,345 | B2 | 7/2007  | Ohsawa et al.   |
| 7,567,963 | B2 | 7/2009  | Shpeisman et al.|
| 2003/0014472 | A1 | 1/2003 | Ohsawa et al. |
| 2003/0014473 | A1 | 1/2003 | Ohsawa et al. |
| 2007/0198785 | A1 | 8/2007 | Kogge et al.  |
| 2007/0283357 | A1 | 12/2007 | Jeter et al. |
| 2008/0077926 | A1 | 3/2008 | Jeter et al.  |

*Primary Examiner* — Aimee Li (57) ABSTRACT

A system, apparatus and method for multithread handling on a multithread processing device are described herein. Embodiments of the present invention provide a multithread processing device for multithread handling including a plurality of registers operatively coupled to an instruction dispatch block, including thread-control registers for selectively disabling threads. In various embodiments, the multithread processing device may include a thread-operation register for selectively providing a lock to a first thread to prevent a second thread from disabling the first thread while the first thread has the lock. In still further embodiments, the multithread processing device may be configured to atomically disable and release a lock held by a thread. Other embodiments may be described and claimed.

20 Claims, 4 Drawing Sheets

DISABLING THREADS IN MULTITHREAD ENVIRONMENT

CROSS-REFERENCE TO RELATED APPLICATIONS

The present disclosure is a continuation of and claims priority to U.S. patent application Ser. No. 13/330,305, filed Dec. 19, 2011, now U.S. Pat. No. 8,478,971, issued Jul. 2, 2013, which is a continuation of U.S. patent application Ser. No. 12/831,984, filed Jul. 7, 2010, now U.S. Pat. No. 8,082,427, issued Dec. 20, 2011, which is a continuation of U.S. patent application Ser. No. 11/775,444, filed Jul. 10, 2007, now U.S. Pat. No. 7,757,070, issued Jul. 13, 2010, which claims priority under 35 U.S.C. §119(e) to U.S. Provisional Patent Application No. 60/911,070, filed Apr. 10, 2007, which are incorporated herein by reference.

TECHNICAL FIELD

Embodiments of the present invention relate to the field of data processing, in particular, to techniques for multithread handling.

BACKGROUND

Modern multi-core processors have multiple pipelines to run multiple applications and as a result often improve performance for a system simultaneously running multiple tasks. Unfortunately, these multi-core processors also require substantially more power and use more area than a comparable single pipeline processor.

Prior art single pipeline processors may allow multithread processing by employing an operating system to manage hardware resource usage and thread switching. However, a significant performance penalty is incurred each time the processor changes threads.

Although processing multiple threads on a single processor core is desirable, in certain situations it may be necessary or desirable to disable one or more of the threads. For example, it may be useful to disable one or more threads while debugging and performing other testing on a multithread system. In another situation, an application may require, or may perform more optimally, using less than all available threads.

SUMMARY

In view of the problems in the state of the art, embodiments of the present invention are directed to methods for facilitating optimization of handling for multiple instruction threads during an instruction execution period, and methods for such multithread handling. A multithread processing system is also described, suitable to solve the problems, which at least one embodiment of the present invention is based on, with an instruction dispatch block to fetch and issue instructions of a plurality of instruction execution threads for execution by an execution block, and a plurality of registers operatively coupled to the instruction dispatch block. In various embodiments, the plurality of registers may each include a thread-control register associated with an instruction execution thread, the thread-control register including a thread-control bit for selectively disabling the associated instruction execution thread.

More specifically, with the foregoing and other considerations in view, there is provided, in accordance with various embodiments of the invention, a method for multithread handling including fetching and issuing instructions of a plurality of instruction execution threads for execution by an execution block; modifying a first thread-control bit of a first thread-control register associated with the first instruction execution thread to disable the first instruction execution thread; and modifying a second thread-control bit of a second thread-control register associated with the second instruction execution thread to disable the second instruction execution thread.

In various embodiments, a first thread-control bit may be modified by a second instruction execution thread to disable the first instruction execution thread.

In various embodiments, the method may further comprise fetching and issuing at least one instruction of the first instruction execution thread prior to disabling the first instruction execution thread. In various other embodiments, the method may comprise stopping fetching and issuing instructions of the first instruction execution thread immediately upon disabling the first instruction execution thread.

In various embodiments, the method may further comprise modifying a thread-operation bit of a thread-operation register to provide a first lock to the first instruction execution thread to prevent the second instruction execution thread from disabling the first instruction execution thread. In some embodiments, the method may further comprise modifying a second thread-operation bit to provide a second lock to the second instruction execution thread to prevent another instruction execution thread from disabling the second instruction execution thread.

In some embodiments, the method may comprise modifying the thread-operation bit to release the first lock held by the first instruction execution thread. In various embodiments, the thread-operation bit may be modified to release the first lock after the first instruction execution thread is disabled. In still other embodiments, the first instruction execution thread may be atomically releases the lock and is disabled.

A multithread processing device is also described, suitable to solve the problems which at least one embodiment of the invention is based on, including an instruction dispatch means to fetch and issue instructions of a plurality of instruction execution threads for execution by an execution means. In various embodiments, the processing device may include storage means operatively coupled to the instruction dispatch means, including a thread-control means associated with an instruction execution thread for selectively disabling the instruction execution thread.

In still further embodiments, the storage means may further include at least one additional thread-control means each associated with additional instruction execution threads for selectively disabling the additional instruction execution threads.

In various embodiments, the first thread-control means may be selectively accessible to a second instruction thread to selectively disable the first instruction execution thread. In still other embodiments, the first thread-control means may be accessible to only the first instruction execution thread to selectively disable the first instruction execution thread.

In various embodiments, the instruction dispatch means may be configured to fetch and issue at least one instruction of the first instruction execution thread upon the disablement of the first instruction execution thread. In other embodiments, the instruction dispatch means may be configured to stop fetching and issuing instructions of the first instruction execution thread immediately upon the disablement of the first instruction execution thread.

In some embodiments, the storage means may include a thread-operation means for selectively providing a first lock to the first instruction execution thread to prevent a second instruction execution thread from disabling the first instruction execution thread while the first instruction execution thread has the lock. In some of these embodiments, the thread-operation means may be configured to selectively provide a second lock to a second instruction execution thread to prevent another instruction execution thread from disabling the second instruction execution thread while the second instruction execution thread has the second lock. In various embodiments, the thread-operation means may be accessible to only one instruction execution thread at a time.

In still further embodiments, the thread-operation means may be further configured to selectively release the first lock held by the first instruction execution thread, and in some of these embodiments, the thread-operation means may be configured to release the first lock after the first instruction execution thread is disabled.

In accordance with various embodiments, the multithread processing system may be configured to atomically disable and release the first lock held by the first instruction execution thread.

In various embodiments, the execution means may include any instruction execution means such as a processing core co-disposed in an integrated circuit package with the instruction dispatch means. In some embodiments, the instruction dispatch means may include at any instruction dispatch means, such as an instruction unit responsible for ensuring that instructions are properly decoded, fetched, queued, and dispatched for execution. Besides containing control circuitry for performing these functions, the instruction dispatch means may also include additional storage means, such as an instruction cache and/or a data cache In accordance with again an additional feature of at least one embodiment of the invention, the processing device is a processor. In accordance with still a further feature of at least one embodiment of the invention, the processing device is an embedded processor. In accordance with a concomitant feature of the invention, the processing device is an integrated circuit.

Other features that are considered as characteristic for embodiments of the invention are set forth in the appended claims.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use the phrases "in an embodiment," "in embodiments," or "in various embodiments," which may each refer to one or more of the same or different embodiments. Furthermore, the terms "comprising," "including," "having," and the like, as used with respect to embodiments of the present invention, are synonymous. The phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)," that is, A is an optional element.

"Circuitry," as used in any embodiment herein, may comprise, for example, singly or in any combination, hardwired circuitry, programmable circuitry, state machine circuitry, and/or firmware that stores instructions executed by programmable circuitry.

Figure 1:
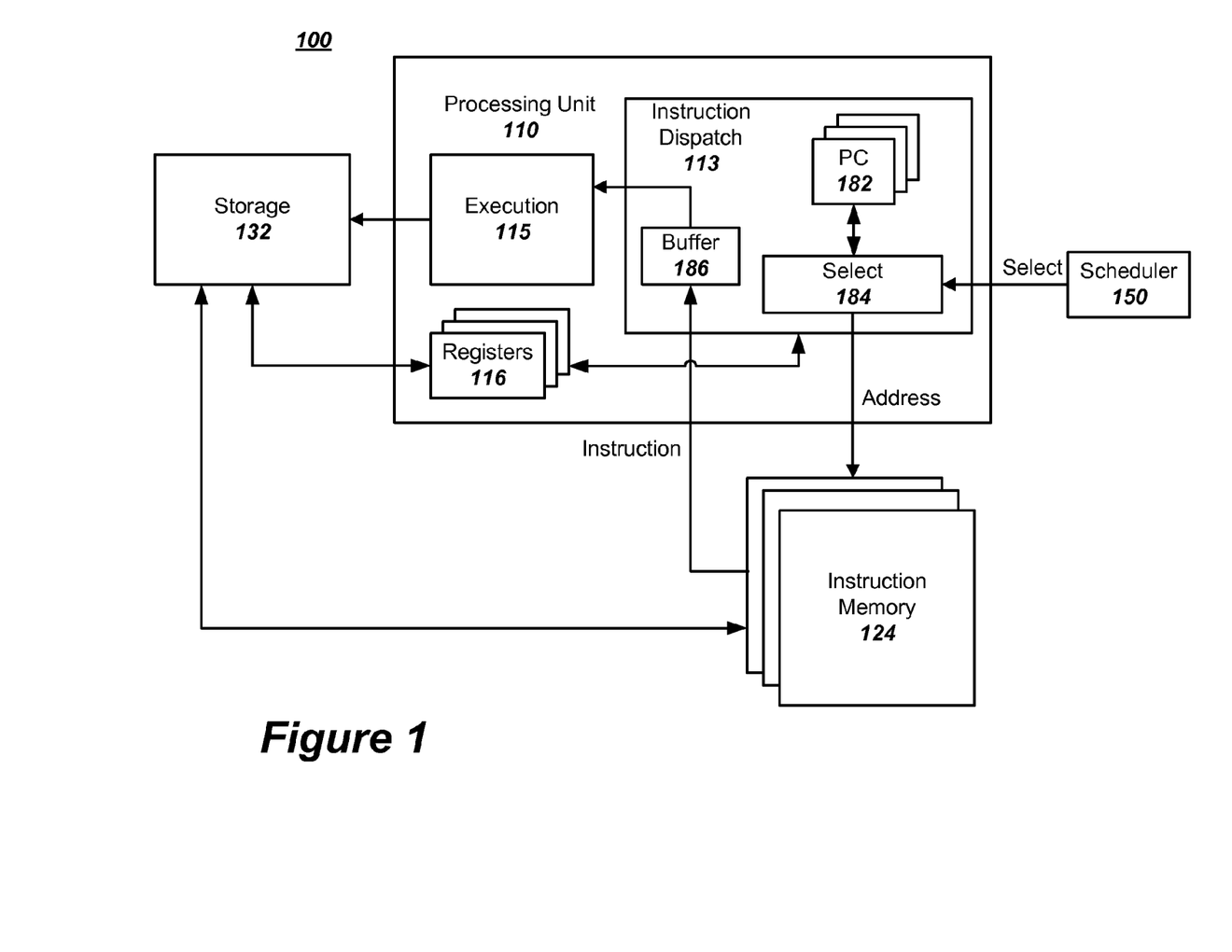
FIG. 1 a block diagram of a multithread system, in accordance with various embodiments of the present invention.

Referring to FIG. 1, a block diagram illustrates an exemplary multithread processing system 100 including multithread processing unit 110 with execution block 115, instruction dispatch block 113, and registers 116 that are operatively coupled to each other at least as shown. In alternate embodiments, the present invention may be practiced with other processing environments and may include various system devices in addition to or instead of the illustrated system devices.

In various embodiments, processing unit 110 may include execution block 115 to execute instructions and instruction dispatch block 113 to fetch and issue instructions for execution by execution block 115. In various embodiments, instruction dispatch block 113 may be configured to interleavingly fetch and issue instructions from multiple instruction execution threads for execution by execution block 115. Such a configuration may improve the performance (e.g., per area/power) for a system running multiple tasks simultaneously. In one embodiment, instruction dispatch block 113 may fetch and issue instructions from at least a first instruction execution thread and a second instruction execution thread, for execution by execution block 115. In various embodiments, instruction dispatch block 113 may fetch and issue instructions from multiple instruction execution threads concurrently for execution by the execution block 115.

In various embodiments, instruction dispatch block 113 may provide for a thread switch when changing between instruction execution threads. As such, an instruction from a second thread may be executed immediately after an instruction from a first thread, such that the respective instructions are executed on subsequent cycles.

In various embodiments, instruction dispatch block 113 is operatively coupled to execution block 115 and includes one or more program counters 182 for each instruction execution thread to interleave the threads and to switch processing unit 110 between threads by switching to one of the corresponding program counters 182 that is to provide the next instruction. Accordingly, switching may associate each thread with a unique allocated program counter 182. In some embodiments, instruction dispatch block 113 may associate a first program counter 182 with a first instruction execution thread and at least one other program counter 182 with each additional instruction execution thread. In one embodiment, each instruction execution thread has a different program counter 182.

In various embodiments, instruction dispatch block 113 may alternatively provide switching using dedicated registers 116 associated with each thread. One or more of thread registers 116 may each be configured to load into program counter 182 the address of the next instruction to be executed based on which thread is selected next. Thread registers 116 may also include the number of cycles a particular thread should be active.

Multi-thread processing system 100 of FIG. 1 also illustrates various closely associated system devices, any one or more of which may be operatively coupled to processing unit 110 including, for example, buffer 186, instruction memory 124, scheduler 150, and storage 132. In various embodiments, instruction memory 124 may include various memory and/or cache structures configured to store instructions and/or data relating to the various threads in a manner to provide timely responses to fetch requests from instruction dispatch block 113. In various embodiments, the cache structures may include multiple levels of caches (e.g., L1 and/or L2 cache).

In various embodiments, scheduler 150 controls the interleaving fetching and issuing of instructions by instruction dispatch block 113. In one embodiment, scheduler 150 outputs an execution thread selection signal to select block 184 in instruction dispatch block 113 to control interleavingly fetching and issuing of instructions by instruction dispatch block 113. In one embodiment, scheduler 150 controls interleavingly fetching and issuing of instructions by instruction dispatch block 113, based at least in part on corresponding contiguous execution clock cycle allocations of the instruction execution threads. In one embodiment, instruction dispatch block 113 is adapted to fetch and issue at least one instruction from an instruction cache 130 for a selected one of a first and a second instruction execution thread. According to some embodiments, dispatch block 113 may fetch and issue at least one instruction each time instruction dispatch block 113 is signaled by scheduler 150 to fetch instructions for the selected one of the first and second instruction execution threads.

Storage 132 may include semiconductor firmware memory, programmable memory, non-volatile memory, read only memory (ROM), electrically programmable memory, random access memory (RAM), flash memory (which may include, for example, NAND or NOR type memory structures), magnetic disk memory, and/or optical disk memory. Either additionally or alternatively, storage 132 may comprise other and/or later-developed types of computer-readable memory including electrical, optical, acoustical or other form of propagated signals (e.g., carrier waves, infrared signals, digital signals). Machine-readable firmware program instructions may be stored in storage 132. In various embodiments, storage 132 includes any storage medium or machine-accessible medium and/or any storage mechanism that provides (i.e., stores and/or transmits) information in a form readable by a machine (e.g., a computer).

In various embodiments, registers 116 may comprise one or more thread-control registers for controlling, at least in part, the multithread processing system 100. In various embodiments, one or more of the thread-control registers may be associated with a particular instruction execution thread. For example, registers 116 may include a first thread-control register associated with a first instruction execution thread and may further include one or more other thread-control registers each associated with one or more other instruction execution threads.

In various embodiments, one or more of the thread-control registers may each include a thread-control bit for selectively disabling an instruction execution thread associated with the thread-control register. A thread-control bit may be configured to be modified (e.g., toggled between a logic high state and a logic low state) to control the disabling and enabling of the associated instruction execution thread. In various embodiments, registers 116 may include a first thread-control register associated with a first instruction execution thread and including a first thread-control bit for selectively disabling the first instruction execution thread. Registers 116 may further include a second thread-control register associated with a second instruction execution thread and including a second thread-control bit for selectively disabling the second instruction execution thread. Registers 116 may further include additional thread-control registers, depending on the specific application.

In various embodiments, one or more of the thread-control registers may be selectively accessible to one or more of the instruction execution threads. For example, in some embodiments, access to a thread-control register and/or a thread-control bit may be limited to the associated instruction execution thread. In the embodiments, access to a first thread-control register and/or a first thread-control bit associated with a first instruction execution thread may be configured so that only the first instruction execution thread may access the first thread-control register and/or a first thread-control bit. In various embodiments, access to a thread-control register may be accessible to not only the associated instruction execution thread but also by one or more of the other instruction execution threads. In still further embodiments, one or more of the thread-control registers may be accessible to non-associated instruction execution threads while another one or more of the thread-control registers may be accessed by only the associated instruction execution thread. Such a configuration may be desired in applications wherein a master instruction execution thread may access registers of one or more other threads ("child threads"), but not vice versa, so that it is impossible for all threads (child and master threads) to be disabled at the same time. It is noted that in various embodiments, the term "access" may include either one or both of read access and write access.

In various embodiments, instruction dispatch block 113 may be configured to fetch and issue at least one instruction of an instruction execution thread upon the disablement of the instruction execution thread. For example, when an instruction execution thread is disabled, the instruction execution thread may be allowed to finish processing any one or more instructions already in an instruction pipeline.

In various embodiments, instruction dispatch block 113 may be configured to stop fetching and issuing instructions of an instruction execution thread immediately upon the disablement of the instruction execution thread. For example, when an instruction execution thread is disabled, the disabling instruction may be the last instruction the instruction execution thread may be allowed to process, while any remaining instruction(s) in the instruction pipeline are ignored. In some embodiments, any instruction(s) remaining in the instruction pipeline may be flushed from multithread processing unit 110 (e.g., flushed from buffer 186).

In various embodiments, instruction dispatch block 113 may be configured such that whether another instruction is fetched and issued is based at least in part on whether an instruction execution thread is disabling itself or another instruction execution thread. For instance, in some embodiments, instruction dispatch block 113 may be configured to fetch and issue at least one instruction of a first instruction execution thread upon the disablement of the first instruction execution thread if a second instruction execution thread disabled the first instruction execution thread. However, in various other embodiments, instruction dispatch block 113 may be configured to stop fetching and issuing instructions of the first instruction execution thread immediately, without fetching and issuing any other instructions, upon the disablement of the first instruction execution thread if the first instruction execution thread disabled itself.

In various embodiments, registers 116 may comprise one or more thread-operation registers for controlling, at least in part, access to one or more elements of multithread processing system 100. In various embodiments, a thread-operation register may include one or more thread-operation bits for selectively providing a lock to one or more instruction execution threads. For example, a first instruction execution thread may obtain a lock by way of modification of a thread-operation bit, and the lock once obtained may prevent a second instruction execution thread from disabling the first instruction execution thread. Such a configuration may allow multithread processing unit 110 to avoid various possibly undesirable situations including, for example, conflicts due to multiple instruction execution threads attempting to access a particular thread-control register at the same time to disable and/or enable the instruction execution thread associated with the thread-control register.

In various embodiments, the thread-operation bit may be configured to be modified by an instruction execution thread (e.g., toggled between a logic high state and a logic low state) for providing a lock to the instruction execution thread or for releasing a lock so that the lock may be available to another instruction execution thread. In some embodiments, access to the thread-operation register may be restricted to a single instruction execution thread or may be available to more than one thread. For example, the thread-operation register may include more than one thread-operation bit, and the thread-operation register may be accessible to more than one instruction execution thread to allow more than one instruction execution thread to obtain a lock at a given time. In some embodiments, the thread-operation register may be accessible to only a limited number of instruction execution threads at any given time. For example, the thread-operation register may be accessible to a single instruction execution thread at a time.

In various embodiments, multithread processing unit 110 may be configured to perform various operations atomically. For example, in various embodiments, multithread processing unit 110 may be configured to atomically disable an instruction execution thread and release a lock held by the instruction execution thread (which may sometimes collectively be referred to herein as a "thread suicide operation"). Such a configuration may allow multithread processing unit 110 to avoid various possibly undesirable situations including, for example, carrying resource issues and deadlocking, which may occur if an instruction execution thread obtains a lock and then disables itself. In that situation, the disabling instruction may be the last instruction the instruction execution thread is capable of processing and thus, would not be capable of releasing the lock.

In various embodiments, registers 116 may comprise one or more thread-suicide registers for performing a thread suicide operation for an instruction execution thread. A thread-suicide register may include a thread-suicide instruction, which may be processed by multithread processing unit 110 to atomically disable an instruction execution thread and release the lock held by the instruction execution thread.

In various embodiments, multithread processing unit 110 may be configured to require an instruction execution thread to first obtain a lock prior to performing a thread suicide operation for the instruction execution thread. The multithread processing unit 110 may be configured to ignore or otherwise not respond to a thread-suicide instruction issued by an instruction execution thread. However, if an instruction execution thread issues a thread-suicide instruction without having first obtained a lock, multithread processing unit 110 may be configured to process the thread-suicide instruction as though an instruction for locking the instruction execution thread was first issued. In other words, multithread processing unit 110 may first obtain a lock for the instruction execution thread and then process the thread-suicide instruction.

In various embodiments, instruction dispatch block 113 may be configured to stop fetching and issuing instructions of an instruction execution thread immediately upon the atomic disablement/lock-release of the instruction execution thread. For example, when multithread processing unit 110 atomically disables an instruction execution thread and releases the lock on the instruction execution thread, any remaining instruction(s) in the instruction pipeline for the instruction execution thread may be ignored. In some embodiments, any instruction(s) remaining in the instruction pipeline may be flushed from multithread processing unit 110 (e.g., flushed from buffer 186). Instructions in the instruction pipeline may be ignored or flushed even if an instruction execution thread is disabled by another instruction execution thread.

Figure 2:
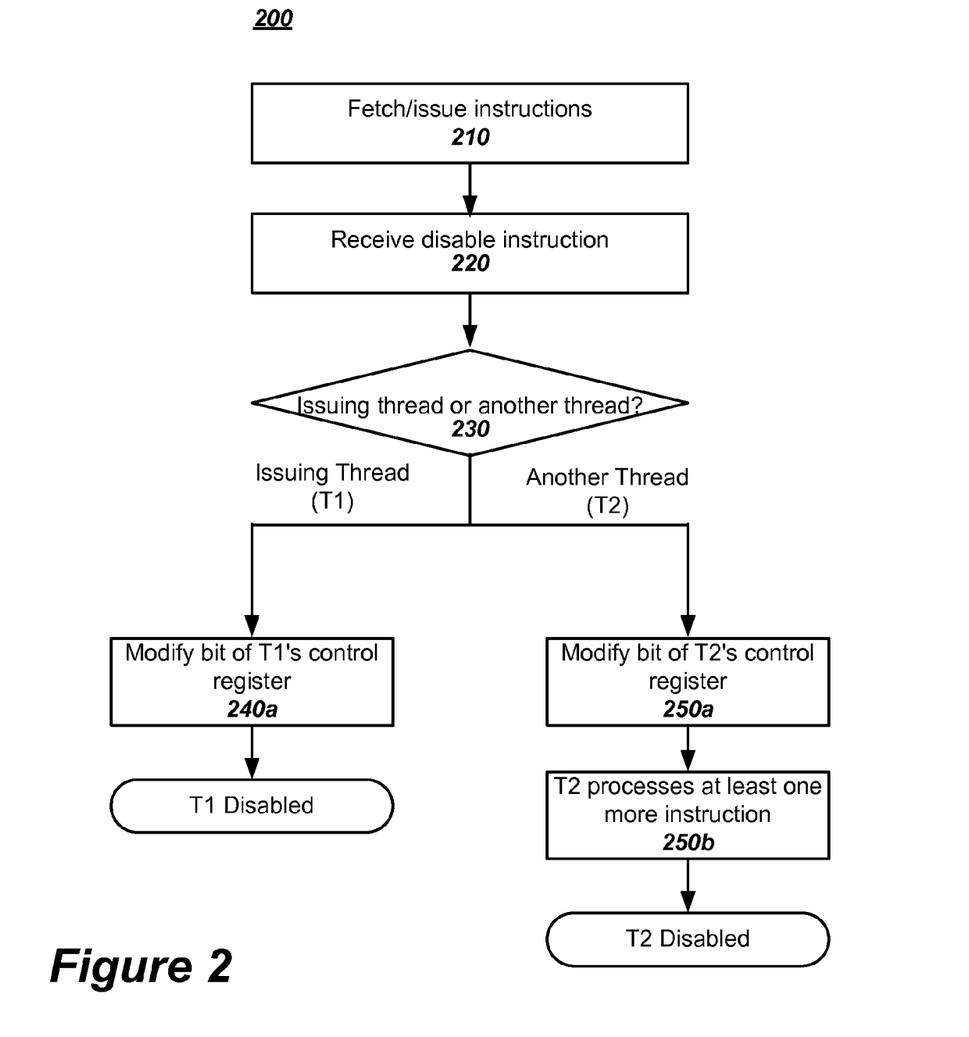
FIG. 2 is a flow diagram illustrating a portion of the operations associated with multithread handling, in accordance with various embodiments of the present invention.
Figure 3:
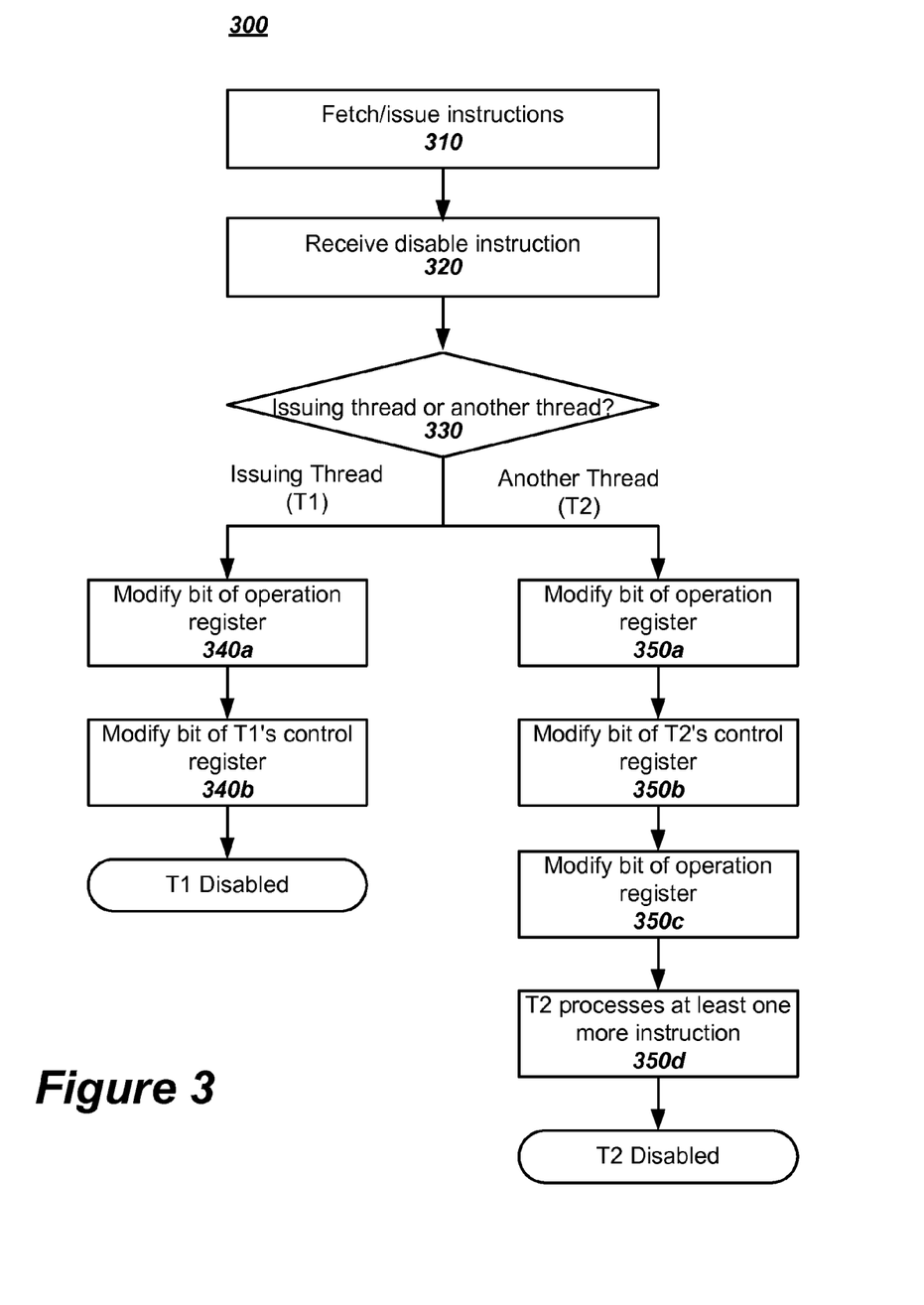
FIG. 3 is a flow diagram illustrating a portion of the operations associated with multithread handling, in accordance with various embodiments of the present invention.
Figure 4:
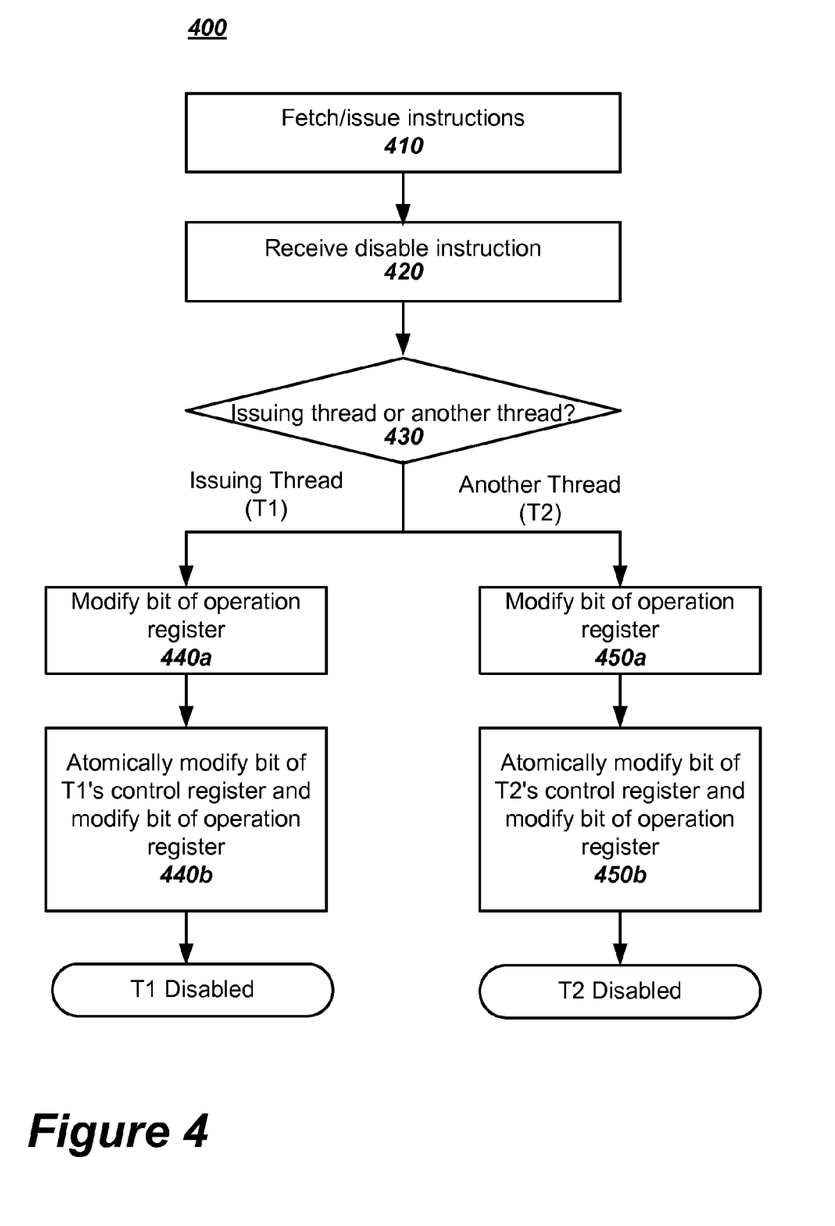
FIG. 4 is a flow diagram illustrating a portion of the operations associated with multithread handling, in accordance with various embodiments of the present invention.

Turning now to FIGS. 2-4, methods in accordance with various embodiments are described in terms of computer firmware, software, and hardware with reference to a flow diagram. Portions of the methods to be performed by a processing device may constitute state machines or computer programs made up of computer-executable instructions. These instructions are typically maintained in a storage medium accessible by the processing device. Describing the methods by reference to flow diagrams enables one skilled in the art to develop such programs including such instructions to carry out the methods, and other methods in accordance with various embodiments of the present invention, on suitably configured processing devices, such as a multithread processor of a computing device executing the instruction execution threads from machine-accessible media. The computer-executable instructions may be written in a computer programming language or may be embodied in firmware logic. If written in a programming language conforming to a recognized standard, such instructions may be executed on a variety of hardware platforms and for interface to a variety of operating systems, such as multithread aware and non-multithread operating systems.

The various embodiments are not described with reference to any particular programming language. It will be appreciated by those skilled in the art that a variety of programming languages may be used to implement the teachings of at least one embodiment of the invention as described herein. Furthermore, it is common in the art to speak of software, in one form or another (e.g., program, procedure, process, application, etc.), as taking an action or causing a result. Such expressions are merely a shorthand way of saying that execution of the software by a network device causes the processor of the computer to perform an action or to produce a result.

Illustrated in FIG. 2 is a flow diagram of a portion of the operations associated with multithread handling by a multithread processing system 200 (e.g., such as ones previously described with reference to FIG. 1), in accordance with various embodiments. As illustrated, multithread processing system 200 may fetch and issue instructions of one or more instruction execution threads to an execution block for execution in block 210. In various embodiments, multithread processing system 200 may fetch and issue one or more first instructions of a first instruction execution thread to an execution block for execution, and fetch and issue one or more second instructions of a second instruction execution thread to an execution block for execution. In various other embodiments, multithread processing system 200 may fetch and issue instructions for more or less instruction execution threads, depending on the application.

As illustrated in block 220, multithread processing system 200 may receive an instruction for disabling an instruction execution thread, and in query block 230, the multithread processing system 200 may determine whether the instruction is to disable the instruction-issuing instruction execution thread (T1) or another instruction execution thread (T2). If the instruction is to disable T1, multithread processing system 200 may modify a thread-control bit of T1's thread-control register in block 240a to disable T1. Multithread processing system 200 may be configured to stop fetching and issuing instructions of an instruction execution thread immediately upon the disablement of T1. In other words, when an instruction execution thread is disabled, the disabling instruction may be the last instruction the instruction execution thread processes, while any remaining instruction(s) in the instruction pipeline are ignored. In some embodiments, any instruction(s) remaining in the instruction pipeline may be flushed from multithread processing system 200 (e.g., flushed from a buffer of multithread processing system 200).

If, however, the instruction is to disable T2, multithread processing system 200 may modify a thread-control bit of T2's thread-control register in block 250a. However, prior to the disablement of T2, T2 may process at least one more instruction in block 250b. For example, when an instruction execution thread is disabled, the instruction execution thread may be allowed to finish processing one or more instructions already in an instruction pipeline.

Illustrated in FIG. 3 is a flow diagram of a portion of the operations associated with multithread handling by a multithread processing system 300 (e.g., such as ones previously described with reference to FIG. 1), in accordance with various embodiments. As illustrated, multithread processing system 300 may fetch and issue instructions of one or more instruction execution threads to an execution block for execution in block 310. Multithread processing system 300 may fetch and issue one or more first instructions of a first instruction execution thread to an execution block for execution, and fetch and issue one or more second instructions of a second instruction execution thread to an execution block for execution. Multithread processing system 300 may fetch and issue instructions for more or less instruction execution threads, depending on the application.

As illustrated in block 320, multithread processing system 300 may receive an instruction for disabling an instruction execution thread, and in query block 330, multithread processing system 330 may determine whether the instruction is to disable the instruction-issuing instruction execution thread (T1) or another instruction execution thread (T2). If the instruction is to disable T1, multithread processing system 300 may modify a thread-operation bit of a thread-operation register to provide a lock to T1 in block 340a, and may modify a thread-control bit of T1's thread-control register in block 340b to disable T1. Multithread processing system 300 may be configured to stop fetching and issuing instructions of an instruction execution thread immediately upon the disablement of T1. In other words, when an instruction execution thread is disabled, the disabling instruction may be the last instruction the instruction execution thread processes, while any remaining instruction(s) in the instruction pipeline are ignored. In some embodiments, any instruction(s) remaining in the instruction pipeline may be flushed from multithread processing system 300 (e.g., flushed from a buffer of multithread processing system 300).

If, however, the instruction is to disable T2, multithread processing system 300 may modify a thread-operation bit of a thread-operation register to lock T2 in block 350a, and may modify a thread-control bit of T2's thread-control register to disable T2 in block 350b. However, prior to the disablement of T2, T2 may process at least one more instruction in block 350d. For example, in various embodiments, when an instruction execution thread is disabled, the instruction execution thread may be allowed to finish processing any one or more instructions already in an instruction pipeline.

In various embodiments, multithread processing system 300 may modify the thread-operation bit of the thread-operation register to unlock T2 in block 350c. Although the unlocking operation is illustrated as occurring prior to T2's processing of at least one more instruction in block 350d, the order may be reversed or simultaneous such that T2 may process at least one more instruction before or at the same time as multithread processing system 300 unlocks T2.

As discussed previously and as illustrated in FIG. 3, in the situation for T1, if T1 is disabled, it will remain the owner of the lock (i.e., it will retain the lock) and since T1 is disabled, it is not possible for it to release the lock (to allow the lock to be acquired, for example, by another instruction execution thread). Illustrated in FIG. 4 is a flow diagram of a portion of the operations associated with multithread handling by a multithread processing system 400 (e.g., such as ones previously described with reference to FIG. 1), in accordance with various embodiments, and including a thread-suicide operation. As illustrated, multithread processing system 400 may fetch and issue instructions of one or more instruction execution threads to an execution block for execution in block 410. Multithread processing system 400 may fetch and issue one or more first instructions of a first instruction execution thread to an execution block for execution, and fetch and issue one or more second instructions of a second instruction execution thread to an execution block for execution. Multithread processing system 400 may fetch and issue instructions for more or less instruction execution threads, depending on the application.

As illustrated in block 420, in accordance with various embodiments, multithread processing system 400 may receive an instruction for disabling an instruction execution thread, and in query block 430, multithread processing system 400 may determine whether the instruction is to disable the instruction-issuing instruction execution thread (T1) or another instruction execution thread (T2). If the instruction is to disable T1, multithread processing system 400 may modify a thread-operation bit of a thread-operation register so that T1 may obtain a lock in block 440a, and may atomically modify a thread-control bit of TVs thread-control register to disable T1 and modify the thread-operation bit of the thread-operation register to release the lock in block 440b. Thus, unlike the situation for T1 illustrated in FIG. 3, the lock is released atomically to the disablement of T1 so that the lock is free to be used by another instruction thread.

The method is similar if the instruction is to instead disable T2. If the instruction is to disable T2, multithread processing system 400 may modify a thread-operation bit of a thread-operation register to lock T2 in block 450a, and may atomically modify a thread-control bit of T2's thread-control register to disable T2 and may modify the thread-operation bit of the thread-operation register to unlock T2 in block 450*b*.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
    fetching and issuing instructions of a plurality of instruction execution threads for execution by an execution block;
    receiving a disable instruction to disable a first instruction execution thread of the plurality of instruction execution threads, wherein the disable instruction to disable the first instruction execution thread is received from one of (i) the first instruction execution thread or (ii) a second instruction execution thread of the plurality of instruction execution threads;
    in response to the disable instruction to disable the first instruction execution thread being received from the second instruction execution thread,
        (i) fetching and issuing at least one instruction of the first instruction execution thread, and
        (ii) subsequent to fetching and issuing the at least one instruction of the first instruction execution thread, disabling the first instruction execution thread; and
    in response to the disable instruction to disable the first instruction execution thread being received from the first instruction execution thread, disabling the first instruction execution thread without fetching and issuing any instruction of the first instruction execution thread.

2. The method of claim 1, wherein:
    in response to the disable instruction to disable the first instruction execution thread being received from the first instruction execution thread, the disable instruction is a last instruction executed by the first instruction execution thread.

3. The method of claim 1, further comprising:
    in response to receiving the disable instruction, modifying a first thread-operation bit of a first thread-operation register associated with the first instruction execution thread to engage a first lock to the first instruction execution thread, wherein the first lock is configured to prevent a third instruction execution thread of the plurality of instruction execution threads from disabling the first instruction execution thread while the first instruction execution thread has the first lock engaged.

4. The method of claim 3, further comprising:
    in response to engaging the first lock, modifying a first thread-control bit of the first thread-control register associated with the first instruction execution thread to disable the first instruction execution thread.

5. The method of claim 4, further comprising:
    modifying the first thread-operation bit of the first thread-operation register associated with the first instruction execution thread to release the first lock to the first instruction execution thread.

6. The method of claim 5, wherein:
    the first thread-operation bit of the first thread-operation register is modified to release the first lock concurrently with or subsequent to disabling the first instruction thread.

7. The method of claim 4, wherein modifying the first thread-control bit of the first thread-control register comprises:
    atomically modifying the first thread-control bit of the first thread-control register to disable the first instruction execution thread.

8. The method of claim 1, wherein fetching and issuing at least one instruction of the first instruction execution thread comprises:
    fetching and issuing at least two instructions of the first instruction execution thread.

9. The method of claim 1, further comprising:
    subsequent to and in response to disabling the first instruction execution thread, flushing, from an instruction pipeline, any remaining instructions of the first instruction execution thread.

10. An apparatus comprising:
    an instruction dispatch block configured to fetch and issue instructions of a plurality of instruction execution threads for execution by an execution block; and
    a thread-control register associated with a first instruction execution thread, wherein the thread-control register includes a thread-control bit for selectively disabling the first instruction execution thread, and wherein the thread-control register is configured to
        receive a disable instruction to disable the first instruction execution thread, wherein the disable instruction to disable the first instruction execution thread is received from one of (i) the first instruction execution thread or (ii) a second instruction execution thread of the plurality of instruction execution threads, and
        disable the first instruction execution thread,
    wherein the instruction dispatch block is further configured to
        in response the disable instruction to disable the first instruction execution thread being received from the second instruction execution thread, fetch and issue at least one instruction of the first instruction execution thread prior to the first instruction execution thread being disabled, and
        in response to the disable instruction to disable the first instruction execution thread being received from the first instruction execution thread, refrain from fetching and issuing any instruction of the first instruction execution thread prior to the first instruction execution thread being disabled.

11. The apparatus of claim 10, wherein:
    in response to the disable instruction to disable the first instruction execution thread being received from the first instruction execution thread, the disable instruction is a last instruction executed by the first instruction execution thread.

12. The apparatus of claim 10, further comprising:
    a thread-operation register including a thread-operation bit for selectively providing a first lock to the first instruction execution thread, wherein the first lock is configured to prevent a third instruction execution thread of the plurality of execution threads from disabling the first instruction execution thread while the first instruction execution thread has the first lock.

13. The apparatus of claim 12, wherein in response to the disable instruction to disable the first instruction execution thread, the thread-operation bit is configured to engage the first lock to the first instruction execution thread.

14. The apparatus of claim 13, wherein in response to the request to disable the first instruction thread and subsequent to engaging the first lock, the thread-control bit is configured to disable the first instruction execution thread.

15. The apparatus of claim 14, wherein the thread-operation bit is further configured to release the first lock.

16. The apparatus of claim 14, wherein the thread-operation bit is further configured to release the first lock concurrently with or after disabling the first instruction thread.

17. The apparatus of claim 10, wherein:
the thread-control register associated with the first instruction execution thread is selectively accessible to the second instruction thread to selectively disable the first instruction execution thread.

18. The apparatus of claim 10, wherein, in response the disable instruction to disable the first instruction execution thread being received from the second instruction execution thread, the instruction dispatch block is configured to:
subsequent to the disable instruction being received and prior to the first instruction execution thread being disabled, fetch and issue at least two instruction of the first instruction execution thread.

19. The apparatus of claim 10, wherein:
the instruction dispatch block is further configured to, subsequent to the first instruction execution thread being disabled, flush, from an instruction pipeline, any remaining instructions of the first instruction execution thread.

20. The apparatus of claim 10, wherein the apparatus is a multithreading processor.

* * * * *